United States Patent [19]
McWhinnie et al.

[11] Patent Number: 5,384,295
[45] Date of Patent: Jan. 24, 1995

[54] METHOD OF CREATING A PILLARED LAYERED CLAY (PILC)

[75] Inventors: William R. McWhinnie, Solihull; Stephen P. Bond, Birmingham, both of England

[73] Assignee: British Technology Group Limited, London, England

[21] Appl. No.: 94,076

[22] PCT Filed: Jan. 15, 1992

[86] PCT No.: PCT/GB92/00082
§ 371 Date: Aug. 30, 1993
§ 102(e) Date: Aug. 30, 1993

[87] PCT Pub. No.: WO92/12793
PCT Pub. Date: Aug. 6, 1992

[30] Foreign Application Priority Data
Jan. 29, 1991 [GB] United Kingdom ............ 9101858
Feb. 20, 1991 [GB] United Kingdom ............ 9103588

[51] Int. Cl.⁶ ................ B01J 20/12; B01J 21/16
[52] U.S. Cl. .................... 502/5; 502/62; 502/84
[58] Field of Search ............ 502/5, 84, 62

[56] References Cited

U.S. PATENT DOCUMENTS

| | | | |
|---|---|---|---|
| 4,510,257 | 4/1985 | Lewis et al. | 502/63 |
| 4,515,901 | 5/1985 | Elattar | 502/63 |
| 5,264,404 | 11/1993 | Takahama et al. | 502/5 |

FOREIGN PATENT DOCUMENTS 0279251 8/1988 European Pat. Off.
2176772A 1/1987 United Kingdom.

*Primary Examiner*—Carl F. Dees
*Attorney, Agent, or Firm*—Nixon & Vanderhye

[57] ABSTRACT

The method enables the creation of a pillared layered clay (a PILC) by contacting the clay with a pillaring precursor and delivering energy to the reaction mixture to intercalate the precursor into the clay. The pillaring precursor is an electrically neutral organometallic molecule with a carbon-metal bond which is susceptible to proton attack whereby protons donated from sites of Bronsted acidity in the clay cleave the carbon-metal bond to yield an organic fragment of the precursor and a metal-containing pillaring fragment. A preferred precursor is $Ph_2SnCl_2$.

10 Claims, 1 Drawing Sheet

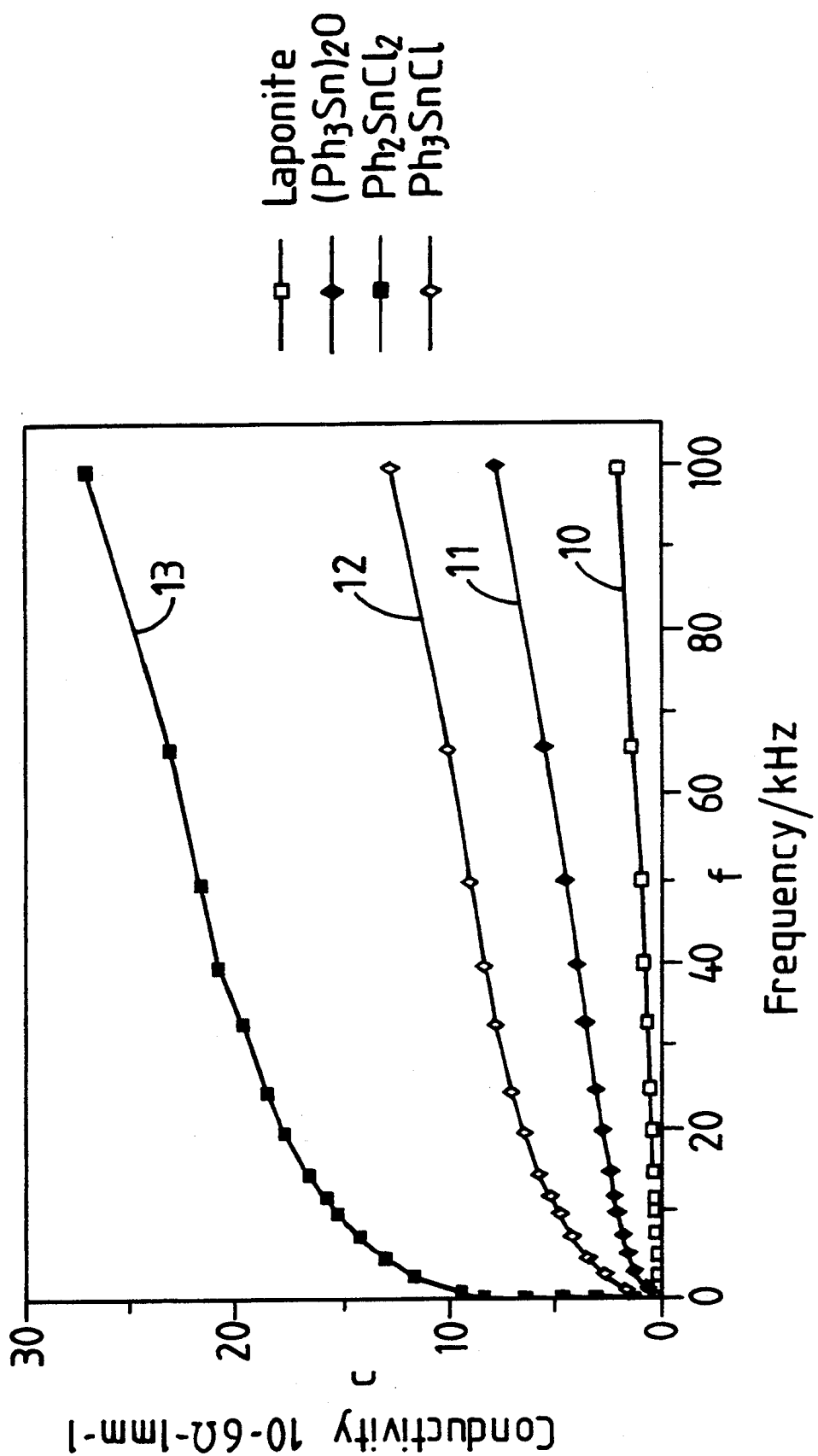

METHOD OF CREATING A PILLARED LAYERED CLAY (PILC)

BACKGROUND OF THE INVENTION

PILCs may have application in the manufacture of electrically-conductive papers. A synthetic hectorite smectite clay (LAPONITE, from Laporte Industries Ltd) is mildly conductive and is used commercially in the manufacture of certain papers, both to pigment the paper and give it conductivity. It is an object of the present invention to increase the electrical conductivity of such clays as LAPONITE, while not losing any of their other properties which give them suitability for their use in papermaking.

In Inorg. Chim. Acta. 1987, 134, at page 99 Mandair and co-workers describe an attempt to increase the conductivity of LAPONITE and a natural montmorillonite by the intercalation of organic molecules. Increase of an order of magnitude in D.C. conductivity were measured.

A method of creating a PILC is disclosed in Inorg. Chem. 1989, 28, 2439-2443 by Petridis, D, and his co-workers. The method involves hydrolysing dimethyltin (IV) chloride and intercalating between the molecular layers of the clay the resulting dimethyltin (IV) cation. Thereafter, tin oxide pillars in the clay are created by heating the intercalated clay with glycerol to more than 200° C.

DESCRIPTION OF THE INVENTION

It is one object of the present invention to devise a route for PILC production which avoids the cation exchange step or the heating step utilised in the Petridis method, so as to preserve to a greater extent the original properties of the clay, and provide enhanced prospects for improvement of electrical conductivity. According to the invention, this object is achieved by selecting as the pillaring precursor an electrically neutral organometallic molecule with a carbon-metal bond which is susceptible to proton attack whereby protons donated from sites of Bronsted acidity in the clay cleave the carbon-metal bond to yield an organic fragment of the precursor and a metal-containing pillaring fragment.

The precursor is preferably aryl, most preferably phenyl. The metal constituent up to now preferred is tin. Suitable molecules are:

$Ph_3SnCl$, $(Ph_3Sn)_2O$, $Ph_2SnCl_2$ which yield $SnO_2$ as the pillaring molecule.

The precursor is conviently presented in a liquid alcohol carrier, conveniently ethanol. Energy to bring about the intercalation of the precursor into the clay can be provided by mechanical shaking, but the thermal energy delivered by an ordinary domestic microwave oven has proved extremely effective with laboratory experimental samples, yielding in 5 minutes a very substantial part of the maximum intercalation achievable with any particular sample.

As mentioned above, the clay can be a montmorillonite but is preferably a synthetic hectorite such as sodium or potassium LAPONITE.

BRIEF DESCRIPTION OF THE DRAWING

The invention will now be further described with reference to the following Example and the attached accompanying drawing which shows conductivity plotted against frequency for materials 10, 11, 12 and 13.

EXAMPLE

LAPONITE clay material in its RD form, that is, free from fluoride and tetron) was obtained from Laporte Industries Ltd. $Ph_3SnCl$ and $Ph_2SnCl_2$ were obtained from Aldrich Chemical Co. Ltd. Triphenyltin oxide was prepared by hydrolysis of $Ph_3SnCl$.

To 10 cm$^3$ of dry ethanol was added 0.3 g of the triphenyl tin oxide and 1.0 g of the LAPONITE clay. In a 700 W microwave oven the mixture was subjected to 5 one minute bursts of microwave radiation. Afterwards, 0.2 g of the oxide were recovered from ethanol washings. Further experiments using irradiation times from 1 to 30 minutes established an optimum time of 5 minutes.

The experiment was repeated with the other two pillaring precursors. The results are given in Table 1 below:

TABLE 1

| COMPOUND | % Material (W/W) Intercalated | |
|---|---|---|
| | Mechanical Shaking | Microwave Irradiation |
| $(Ph_3Sn)_2O$ | 10 | 33 |
| $Ph_3SnCl$ | 45 | 75 |
| $Ph_2SnCl_2$ | 38 | 44 |

To assess conductivity, pressed discs of clay (0.25 g) were used. Copper wires attached to the discs by silver-loaded epoxy resin were connected to a digital AC impedance meter and impedance measurements taken over a range of AC frequencies from 11.7 to 100 Hz. The results are shown in the appended drawing in the form of a graph of conductivity C against AC frequency f in kHz. Plot 10 is of LAPONITE without intercalation. Plot 11 is with intercalation by $(Ph_3Sn)_2O$. Plot 12 is with $Ph_3SnCl$ and Plot 13 with $Ph_2SnCl_2$.

Further analysis of the intercalated clay materials by x-ray powder diffraction, Mossbauer spectroscopy. gas, infra-red and masnmr spectroscopy was carried out. the Mossbauer spectra suggested that all the tin from the $Ph_3SnCl$ underwent conversion to $SnO_2$, whereas some of the $Ph_2SnCl_2$ precursor was not converted. There wag no qualitative analytical evidence for liberation of sodium ions from the clay. This, together with the x-ray diffraction data on increased basal spacings in the clay, suggested tin oxide pillar formation under ambient temperature and pressure and without the sacrificial reaction of an exchanged cation.

A consequence of the formation of tin oxide pillars is the liberation of benzene, but none was found in the supernatant liquid following intercalation, or in the clay washings. With $Ph_3SnCl$, where the results suggested complete conversion, ─C masnmr data on the intercalated clay produced a single resonance at $\delta = 128.5$ ppm (relative to $Me_4Si$) which was attributed to benzene tenaciously held in the clay.

A possible mechanism is that of proton attack on the aryltin bond, the protons coming from sites of Bronsted acidity within the clay.

We claim:

1. A method of creating a pillared layered clay (PILC), said method comprising the steps of:

selecting as a pillaring precursor an electrically neutral molecule containing a metal atom bonded directly to an aryl group;

contacting a clay with said pillaring precursor to produce a reaction mixture; and delivering energy to said reaction mixture to intercalate said precursor into said clay;

whereby protons donated from sites of Bronsted acidity in said clay cleave a carbon-metal bond to yield an organic fragment of said precursor and a metal-containing pillaring fragment.

2. A method according to claim 1, wherein said precursor is a phenyl derivative.

3. A method according to claim 1, wherein said precursor is a tin molecule.

4. A method according to claim 2, wherein said precursor is $Ph_2SnCl_2$.

5. A method according to claim 3, wherein said precursor is $(Ph_3Sn)_2O$ or $Ph_3SnCl$.

6. A method according to claim 1, wherein said precursor is presented in an alcoholic liquid carrier.

7. A method according to claim 1, wherein said energy is microwave energy.

8. A method according to claim 1, wherein said clay is a synthetic hectorite.

9. A method according to claim 8, wherein said clay is a sodium or potassium laponite.

10. A method according to claim 1, wherein said clay is a montmorillonite.

* * * * *